May 5, 1931. J. BEYER 1,803,378
VALVE
Filed July 19, 1928
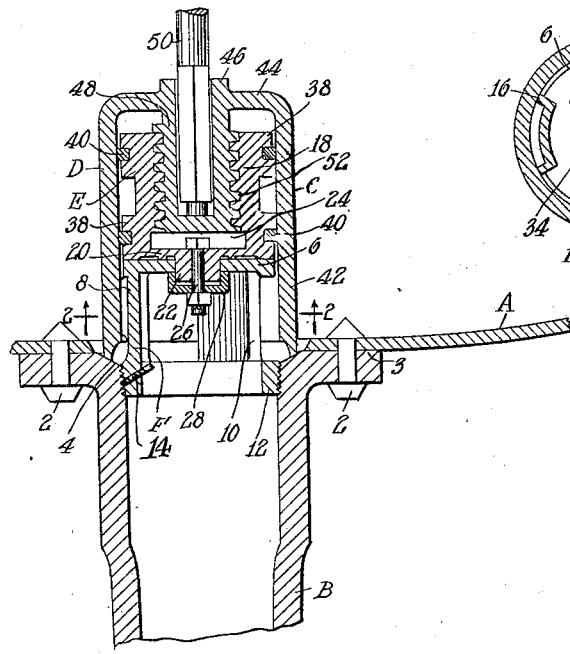
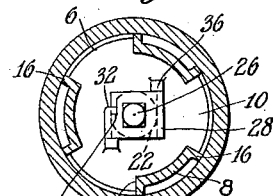
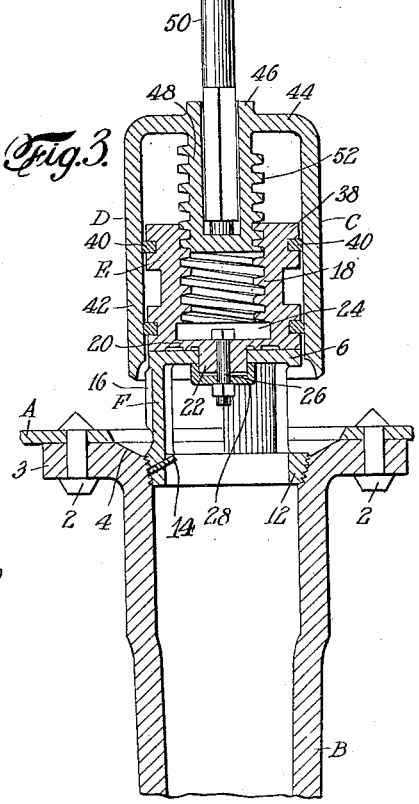
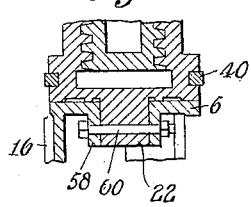
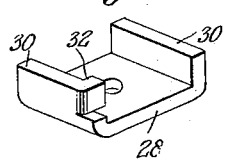
INVENTOR
John Beyer
BY F. H. Gibbs
ATTORNEY Patented May 5, 1931

1,803,378

UNITED STATES PATENT OFFICE

JOHN BEYER, OF BAYONNE, NEW JERSEY, ASSIGNOR TO AMERICAN CAR AND FOUNDRY COMPANY, OF NEW YORK, N. Y., A CORPORATION OF NEW JERSEY

VALVE

Application filed July 19, 1928. Serial No. 293,909.

This invention relates generally to valves and has particular reference to discharge valves for car tanks, although the principle involved herein is readily adaptable and applicable for purposes of controlling the discharge of lading from any container or receptacle.

Valves employed for controlling the discharge of lading from tanks oftentimes become stuck due to congelation of the tank lading or from other causes, and sometimes in freeing the valve excess force is employed and the valve element and sometimes the operating parts for the valve are fractured. Further, the tank lading often times collects around the operating parts of valves employed in car tanks and congeals, thus rendering the valve difficult to manipulate. In the use of lading which does not congeal such as gasoline, for example, when the valve parts are in immediate contact with the lading, the continued use of such lading rusts the valve parts and the valve, and deposits of foreign matter collect around operating parts and render the valve difficult to operate.

The present invention aims to eliminate the aforesaid disadvantages and has for one object the provision of a valve of the kind described, the operating parts for which are enclosed and sealed against the admission of the tank lading.

A further object of the present invention is the provision of a valve formed of few parts which, if occasion arises, may be easily and quickly replaced.

Another object of the present invention is the provision of a bell-shaped valve, the operating parts for which are contained within said valve and are so arranged that they are sealed against the admission of tank lading.

Other objects and advantages of this invention will be apparent from the following description, taken in conjunction with the accompanying drawings, in which:

Figure 1 is a section through a tank showing the valve in vertical section;

Fig. 2 is a sectional view on the line 2—2 of Fig. 1;

Fig. 3 is a sectional view similar to Fig. 1, but showing the valve in elevated position;

Fig. 4 is a perspective view of the screw block retainer; and

Fig. 5 is a vertical sectional view of a portion of the valve screw and guide, showing a modified form of valve screw retainer.

Referring now more particularly to the drawings, in which similar characters of reference designate similar parts in the several views, in Fig. 1, A indicates a portion of the bottom of a car tank, the same having an opening adjacent which the outlet B is secured as by rivets 2. The valve assemblage of the present invention is shown generally at C and comprises the valve element D, the valve carrier or screw block E and the supporting guide element F to which said screw block E is secured.

The outlet B is preferably tubular, as shown, and the upper end thereof is formed with a lateral attaching flange 3 and with a beveled surface 4 defining a seat for the valve element D. The outlet B is also interiorly threaded adjacent the valve seat 4 whereby to secure the screw block supporting element and valve guide F, the latter comprising a cylindrical structure the upper end of which is provided with a head 6 and the wall 8 of said structure having discharge ports 10 formed therein to permit the discharge of tank lading therethrough into the outlet B.

As shown clearly in Fig. 1, the lower end of guide F is flanged as at 12 and said flange is exteriorly threaded to engage the interior threads of the outlet B whereby to secure the guide in the outlet. To prevent accidental rotation of the guide F, a set screw 14 is employed which is arranged through the flange 12 and extends into the outlet.

The side edges of the wall 8 adjacent the ports 10 therein are outwardly flanged as shown at 16 to provide guide ribs for a valve D, as will be hereinafter pointed out.

In carrying out the present invention, a valve carrier or screw block E is provided which is supported by and secured to the guide F; the block being substantially dumb-bell in shape and comprising a main hollow body portion 18 and a base 20, the latter being provided with a depending lug 22 which extends into an aperture formed in the head 6 of the guide. The block, as just mentioned, is hollow, being provided with a centrally arranged threaded bore which communicates with the chamber 24 in the lower end of the body portion. The block E is retained against movement by means of a bolt 26 which extends through the lug 22 and through a keeper plate or retainer 28.

The keeper plate 28 is preferably of the form shown clearly in Fig. 4 and is provided with oppositely arranged flanges 30, one of which has a tongue 32 struck therefrom to engage a shoulder 34 formed in the lug 22 as clearly shown in Fig. 2, and one end of the opposite flange is adapted to abut a lug 36 formed on the lower surface of the head 6 also as shown in Fig. 2. As before-mentioned, the block E is dumb-bell in shape, providing the spaced flanges 38 each of which is provided with an annular recess in which is seated a sealing ring 40 formed preferably of cast iron or other suitable material, which engage the inner surface of the valve D as shown in Figs. 1 and 3, whereby the interior of the valve assemblage, and hence the operating parts thereof, are sealed against the admission of tank lading.

The valve D is preferably bell-shaped, comprising the squared portion 42 and the head 44, the lower edge of the squared portion being beveled and machined so as to have a nice fit with the valve seat 4.

The head 44 is provided with an integral upstanding boss 46 and a depending socket 48 which receives the squared lower end of a valve rod 50; the interior of the socket being, of course, correspondingly squared whereby rotation of the valve rod 50 will rotate the valve element D. The socket is preferably circular in exterior cross section and the outer surface thereof is threaded as at 52 to work in the internal threads of the screw block E.

The valve rod 50 extends upwardly through a bracket 54 of suitable or desired construction and is provided with a pin 56 to limit the upward movement of the valve; the pin 56 being so positioned on the valve rod relative to the bracket 54 that upon elevation of the valve D, the pin 56 will strike the bracket 54 and limit the upward movement of the valve element D prior to the time when the lower edge of said valve element reaches the lower sealing ring 40, thereby preventing the piston rings being exposed and also preventing the admission of the tank lading to the interior of the valve assemblage above the guide F.

Fig. 5 discloses a modified form of keeper or retaining means for the screw block, and in this figure, it can be seen that the head 6 of the guide is provided with a depending flange 58 adjacent an opening formed in said head through which opening the lug 22 of the screw block E extends. For securing the screw block E to the guide F, a suitable fastener such as a bolt 60 is employed, which passes through the flange 58 and the lug 22, thereby rigidly securing the screw block E and the guide F.

From the above description, it is believed that the operation of the valve of the present invention will be fully apparent, but attention is called to the fact that upon rotation of the valve rod 50, the valve element D will be elevated because of the engagement of the socket 48 with the screw block E. A reversal of rotation of the valve rod 50 will obviously lower the valve to its seated position. With the valve assemblage positioned as shown in Fig. 1, it is apparent that the tank lading is prevented from discharging into the outlet, and it will be obvious that upon elevation of the valve to the position shown in Fig. 3, the rings 40 effectually seal the interior of the valve against the admission of the tank lading. In lowering the valve by means of the valve rod 50, it will be apparent that the valve is guided to its seated position by means of the flanges or ribs 16 formed on the guide F adjacent the ports 10 therein.

The drawings herein disclose the preferred embodiment of the invention, but it is to be understood that these drawings are for illustrative purposes only and that various changes in the form and proportions of the device may be made within the scope of the appended claims without departing from the spirit of the invention.

What is claimed is:

1. A valve assembly comprising a guide element having outlet ports, a valve surrounding said guide element and provided with an exteriorly threaded internal socket, means for actuating said valve comprising a block secured to the guide element and having internal threads with which the socket is engaged whereby upon rotation of the valve the socket is elevated to elevate the valve, and sealing means secured to the block to prevent admission of foreign matter to the interior of the valve.

2. In a valve assembly, a screw block support having outlet ports formed therein, a screw block rigidly secured to said support and provided with a threaded recess, a valve surrounding the support and screw block, sealing means secured to the screw block and in contact with the valve, and means carried by the valve and arranged in the recess to work in the threads therein to actuate said valve upon rotation of the latter.

3. In a valve assembly the combination with a supporting element of a valve surrounding the same and provided with outlet ports, means for actuating said valve comprising a screw block secured to the supporting element, means carried by the valve working in the screw block to elevate the valve, and rings secured to the screw block and engaging the valve to seal the interior of the valve against the admission of foreign matter.

4. A discharge valve for car tanks or the like comprising in combination with a discharge outlet, a supporting element secured to the discharge outlet and having discharge ports, a screw block secured to the supporting element and provided with a threaded recess and external rings, a valve element surrounding said supporting element and screw block, said rings contacting with the valve, and a socket member depending from the valve and arranged within the threaded recess and adapted upon rotation of the valve to work in the threaded recess to elevate the valve.

5. A discharge valve for car tanks or the like comprising in combination with a discharge outlet, a supporting element secured to the discharge outlet and having discharge ports, a screw block secured to the supporting element and provided with a threaded recess and external rings, a valve element surrounding said supporting element and screw block, guide ribs on said supporting element, said rings contacting with the valve, and said valve contacting with the guide ribs, and a socket member depending from the valve and arranged within the threaded recess and adapted upon rotation of the valve to work in the threaded recess to elevate the valve.

6. In a valve assembly, a supporting member for attachment to a bottom discharge outlet of a tank and having discharge ports, a valve carrier secured to the supporting member, sealing rings secured to the carrier, a valve skirting the supporting member and valve carrier and normally seated on the discharge outlet with the inner surface of the valve in engagement with the sealing rings, and a recessed valve screw rotatably engaged within the valve carrier to actuate the valve.

7. In a valve assembly, a supporting member for attachment to the bottom discharge outlet of a tank and having spaced external guide ribs, a valve carrier secured to the supporting member and provided with a threaded central recess and spaced external sealing rings, a valve skirting the supporting member and carrier and having its inner surface engaged with the guide ribs and sealing rings, a centrally arranged valve screw depending from the head of said valve and movably secured within the valve carrier, and a valve rod engaged in the valve screw for actuating said valve.

8. In a valve assembly, a valve guide, a valve surrounding the guide, a valve carrying element alined with the valve guide, and means carried by the valve carrying element for sealing the interior of the valve against the admission of liquid.

9. In a valve assembly, a valve guide, a valve carrying element rigidly secured to and supported by the valve guide and in contact with the valve, and a valve surrounding the valve guide and valve carrying element and guided in its movement thereby.

10. A valve assembly comprising a guide element having outlet ports, a screw block secured to and superposed on said guide element, and a valve surrounding said guide element and screw block and in contact with both thereof.

11. A valve assembly comprising a guide element having outlet ports, a valve supporting element superposed on said guide element, a valve surrounding the guide element and valve supporting element and connected for actuation to the latter, and means carried by the valve supporting element for preventing the entrance of liquid into the interior of the valve.

12. In a valve assembly, a valve guide having outlet ports and a centrally apertured head, a valve carrying element superposed on said guide and centered in the aperture in the guide head, a valve surrounding the guide and valve carrying element and movable relative to the latter to uncover the outlet ports said valve being in contact with the guide and carrying elements to be guided thereby in its movement.

13. In a valve assembly, a valve guide having outlet ports, a valve carrying element immovably supported by and alined with the valve guide, a valve surrounding said guide and valve carrying element and guided in its movement thereby, and means in said valve engaging the valve carrying element whereby to lift the valve upon rotation.

In witness whereof I have hereunto set my hand.

JOHN BEYER.